(12) United States Patent
Kargilis et al.

(10) Patent No.: US 8,739,584 B2
(45) Date of Patent: Jun. 3, 2014

(54) DOOR LOCK RETAINER

(75) Inventors: John S. Kargilis, Northville, MI (US); Terence P. Grace, Bloomfield Hills, MI (US); Ronald A. Evans, Oxford, MI (US); Derek Chance, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 432 days.

(21) Appl. No.: 13/151,338

(22) Filed: Jun. 2, 2011

(65) Prior Publication Data

US 2012/0304542 A1 Dec. 6, 2012

(51) Int. Cl.
*B60R 25/02* (2013.01)

(52) U.S. Cl.
USPC .......... 70/208; 70/256; 70/257; 70/277; 70/283.1; 70/370; 70/451; 70/466

(58) Field of Classification Search
USPC ........... 70/208, 256, 257, 277, 279.1, 283.1, 70/210, 451, 370, 466
See application file for complete search history.

(56) References Cited

U.S. PATENT DOCUMENTS

| | | | | |
|---|---|---|---|---|
| 2,665,157 A | * | 1/1954 | De Vito | 292/216 |
| 3,297,916 A | * | 1/1967 | Wright | 361/710 |
| 4,554,807 A | | 11/1985 | Dolejs | |
| 4,910,980 A | | 3/1990 | Katoh | |
| 5,551,268 A | * | 9/1996 | Carnes et al. | 70/370 |
| 5,884,948 A | * | 3/1999 | Weinerman et al. | 292/216 |
| 5,974,842 A | * | 11/1999 | Schlack et al. | 70/208 |
| 5,987,943 A | * | 11/1999 | Verga et al. | 70/208 |
| 6,209,366 B1 | * | 4/2001 | Zagoroff | 70/208 |
| 6,240,754 B1 | * | 6/2001 | Petersen | 70/417 |
| 6,427,502 B1 | * | 8/2002 | Zagoroff | 70/208 |
| 6,546,767 B1 | * | 4/2003 | Kirejczyk et al. | 70/237 |
| 6,758,503 B2 | * | 7/2004 | Sadler | 292/35 |
| 6,901,638 B2 | * | 6/2005 | Itou et al. | 24/570 |
| 7,036,855 B2 | * | 5/2006 | Lin et al. | 292/216 |
| 7,444,845 B2 | | 11/2008 | Kargilis et al. | |
| 2001/0022051 A1 | * | 9/2001 | Fukumoto et al. | 49/503 |
| 2009/0102625 A1 | * | 4/2009 | de Andrade et al. | 340/426.29 |

* cited by examiner

*Primary Examiner* — Peter M Cuomo
*Assistant Examiner* — Ifeolu Adeboyejo
(74) *Attorney, Agent, or Firm* — Ralph E. Smith

(57) ABSTRACT

A door lock retainer may include a door-latch-mechanism frame, a retainer, and a door-lock cylinder. The door-latch-mechanism frame may support a linkage and include a landing surface. The retainer may include an aperture and a first surface engaging the landing surface and restricting deflection of the linkage. The door-lock cylinder may be received in the aperture and supported by the retainer.

20 Claims, 7 Drawing Sheets

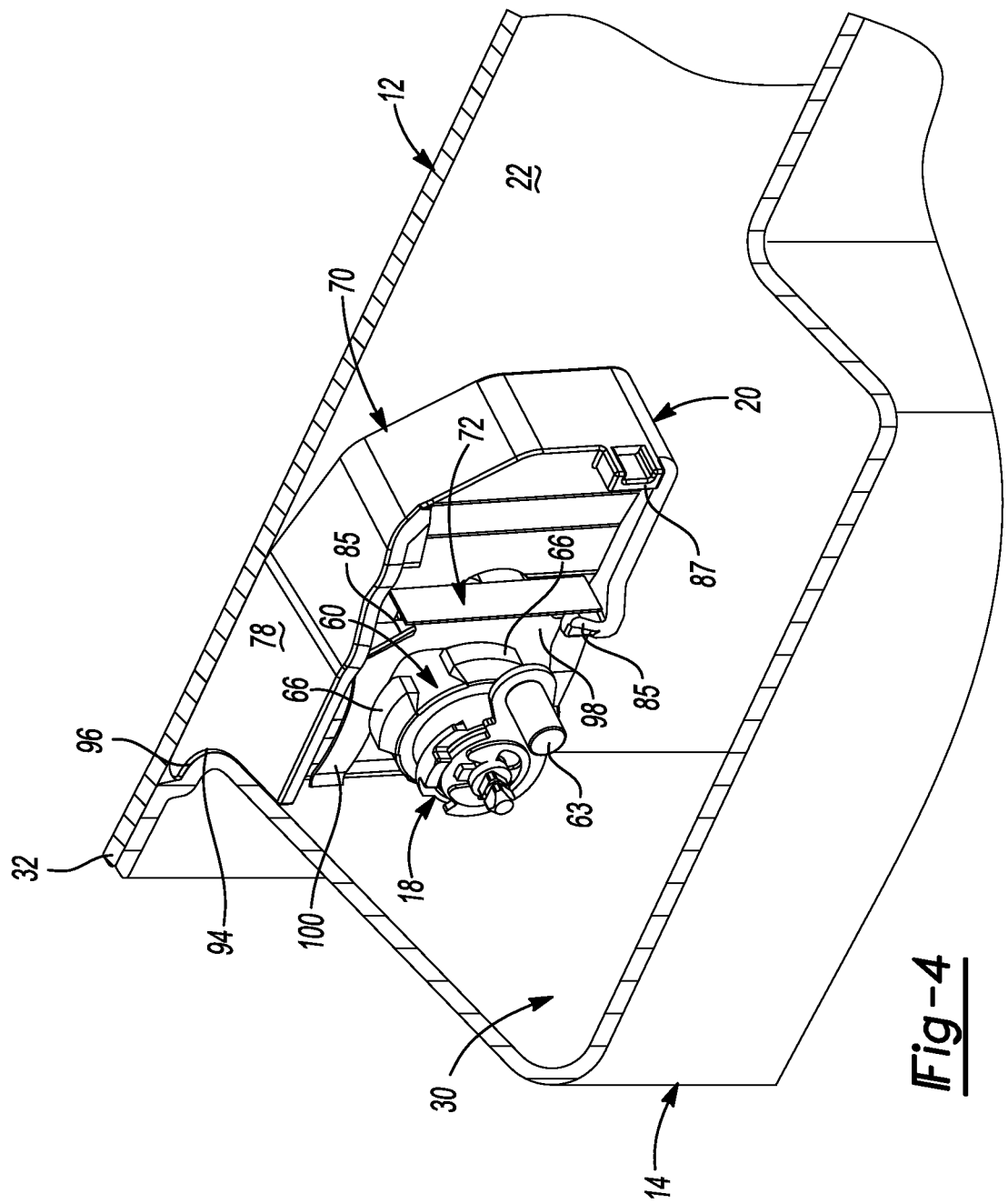

DOOR LOCK RETAINER

FIELD

The present invention relates to a door lock assembly, and more particularly to a door lock retainer.

BACKGROUND

Vehicle doors are provided with locks coupled to a door latch assembly to prevent the door latch mechanism from being actuated by an unauthorized person who may be attempting to gain unauthorized entry into a vehicle. Such an unauthorized person may attempt to forcibly remove or displace the lock to allow the door latch assembly to release the door. Involvement in a side impact crash or event may cause damage or deflection of lock and/or the door latch assembly, which may allow the door to be unintentionally opened. The present disclosure provides an apparatus that may restrict or prevent unauthorized manipulation of a lock assembly and/or a door latch assembly and restrict or prevent damage to or movement of the door latch assembly during a side impact event.

SUMMARY

A door lock retainer may include a door-latch-mechanism frame, a retainer, and a door-lock cylinder. The door-latch-mechanism frame may support a linkage and may include a landing surface. The retainer may include an aperture and a first surface engaging the landing surface and restricting deflection of the linkage. The door-lock cylinder may be received in the aperture and supported by the retainer.

A vehicle door may include an outer door panel, an inner door panel, a latch mechanism frame, a lock cylinder, and a retainer. The inner door panel may be connected to the outer door panel. The latch mechanism frame may be disposed between the inner and outer door panels. The lock cylinder may extend through the outer door panel. The retainer may engage the latch mechanism frame and may include an aperture receiving the lock cylinder and a first portion disposed in a space between the outer and inner door panels. The first portion may engage the outer and inner door panels to restrict motion of the lock cylinder relative to the latch mechanism frame.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 4 is a partially cutaway perspective view of the vehicle door and the retainer disposed therein;

FIG. 5 is a perspective view of the retainer having a retainer clip according to the principles of the present disclosure;

DETAILED DESCRIPTION

Figure 1:
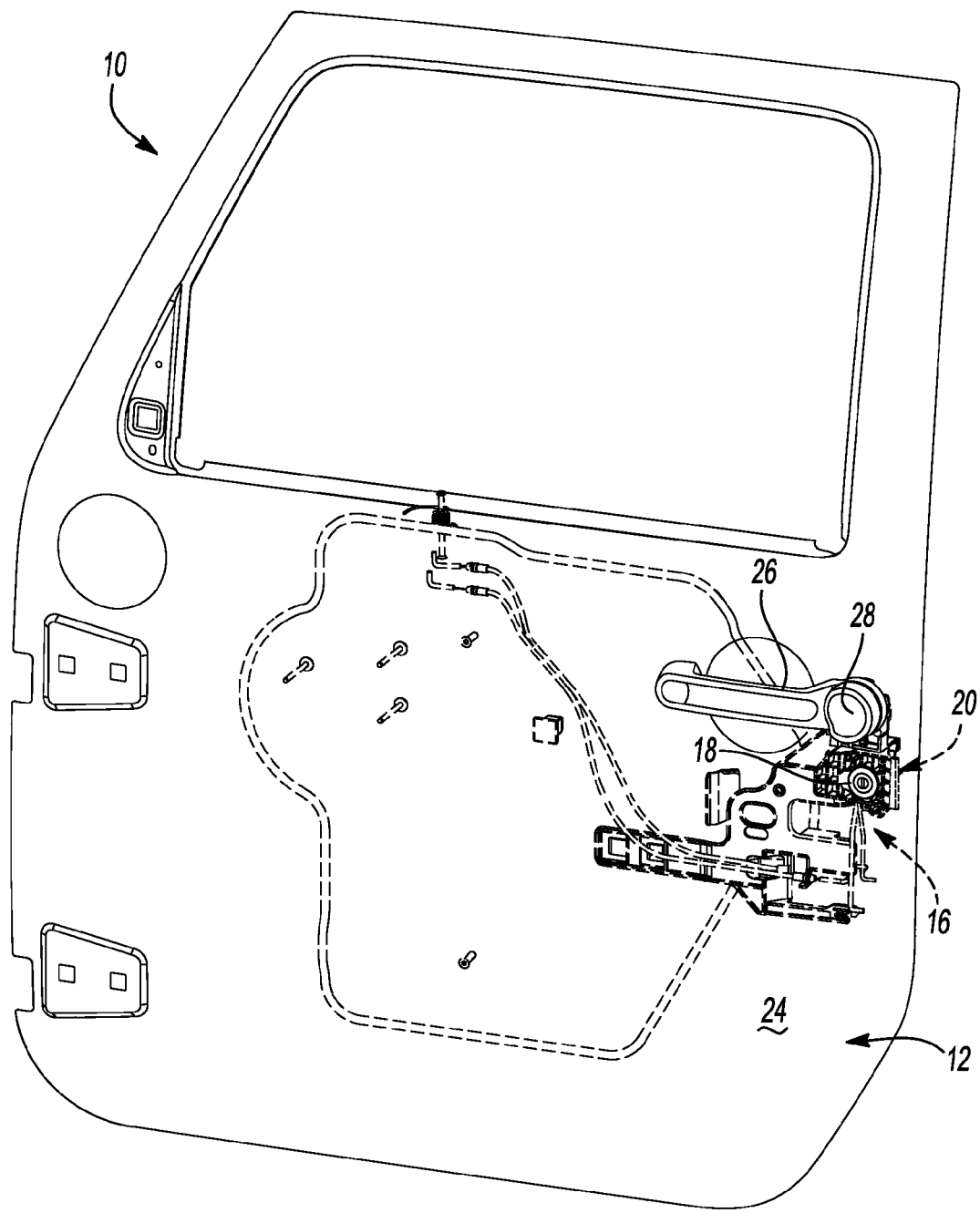
FIG. 1 is a perspective view of a vehicle door according to the principles of the present disclosure.

With reference to FIGS. 1-9, a vehicle door 10 is provided that may include an outer panel 12, an inner panel 14 (FIG. 4), a door latch assembly 16, a lock cylinder 18, and a retainer assembly 20. The door latch assembly 16 may be operable to secure the vehicle door 10 in a closed position and may be actuated to allow the vehicle door 10 to be opened to allow entry into a vehicle. The lock cylinder 18 may be operable to lock the door latch assembly 16 to restrict or prevent the door latch assembly 16 from being actuated to restrict or prevent unauthorized entry into the vehicle. As will be subsequently described, the retainer assembly 20 may cooperate with the outer and inner panels 12, 14 to fix the lock cylinder 18 relative thereto and to prevent or restrict movement of the lock cylinder 18 relative to the door latch assembly 16 and prevent or restrict displacement of the door latch assembly 16 relative to the outer and inner panels 12, 14. In this manner, the retainer assembly 20 may restrict or prevent unauthorized entry into the vehicle and may restrict or prevent unintentional actuation of the door latch assembly 16 during a side impact crash or event.

The outer panel 12 may be formed from sheet metal, for example, and may form an outer shell of the vehicle door 10. The outer panel 12 includes an inward-facing surface 22 (FIG. 4) and an outward-facing surface 24. A door handle 26 may be mounted to the outward-facing surface 24. The door handle 26 may include a spring-loaded actuation mechanism 28, such as a push-button or a lever, for example, that may engage an aperture in the outer panel 12 and may be in communication with the door latch assembly 16.

The inner panel 14 may be formed from a sheet metal or a polymeric material, for example, and may form an inner shell of the vehicle door 10. The inner panel 14 may cooperate with the outer panel 12 to define a cavity 30 therebetween in which the door latch assembly 16 and retainer assembly 20 may be housed. The inner panel 14 may engage the outer panel 12 proximate an outer perimeter 32 of the vehicle door 10, as shown in FIG. 4.

The door latch assembly 16 may include a frame 34 and a linkage 36. The frame 34 may be formed from a polymeric and/or metallic material, for example, and may include a first engagement portion 38, a second engagement portion 40, and a third engagement portion 42. The first engagement portion 38 may be disposed proximate the actuation mechanism 28 and may support a portion of linkage 36, as will be subsequently described. The second engagement portion 40 may include a landing surface 44 and a stop surface 46 that may cooperate to form a generally L-shape cross section and engage the retainer assembly 20. The first engagement portion 38 may extend upward (relative to the view shown in FIG. 3) from the second engagement portion 40 and may be substantially perpendicular to the landing surface 44. The third engagement portion 42 may extend downward (relative to the view shown in FIG. 3) from the second engagement portion 40 and may engage a portion of the lock cylinder 18.

Figure 3:
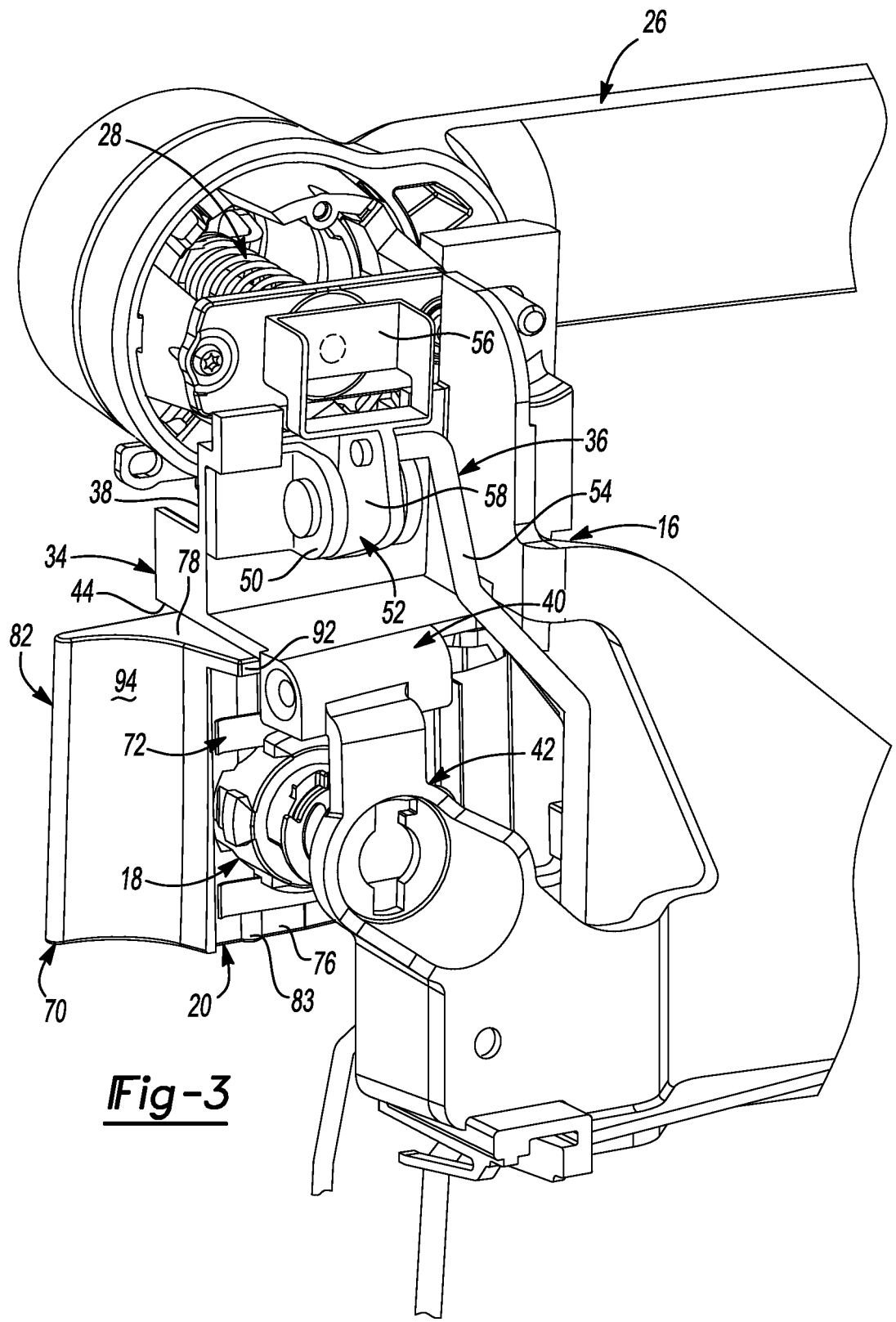
FIG. 3 is another partial perspective view of the door latch assembly, the lock cylinder and the retainer of FIG. 2.

The linkage 36 may operatively connect the actuation mechanism 28 and a latch that secures the vehicle door 10 to a frame of the vehicle. The linkage 36 may include a hinge member 50, a lever member 52 and a push-rod 54. The hinge member 50 may be mounted to the first engagement portion 38 of the frame 34 via threaded fasteners, for example. The lever member 52 may pivotably engage the hinge member 50 and may include a first portion 56 and a second portion 58. The first portion 56 may contact the actuation mechanism 28. The second portion 58 may rotatably engage the push-rod 54 such that rotation of the lever member 52 in response to a user actuating the actuation mechanism 28 causes corresponding downward movement of the push-rod 54, which in turn, causes the latch to release the vehicle door 10 from the frame of the vehicle to allow the vehicle door 10 to be opened. A torsion spring may engage the lever member 52 and the first engagement portion 38 and may bias the lever member 52 toward the upright position relative to the frame 34, as shown in FIG. 3.

Figure 7:
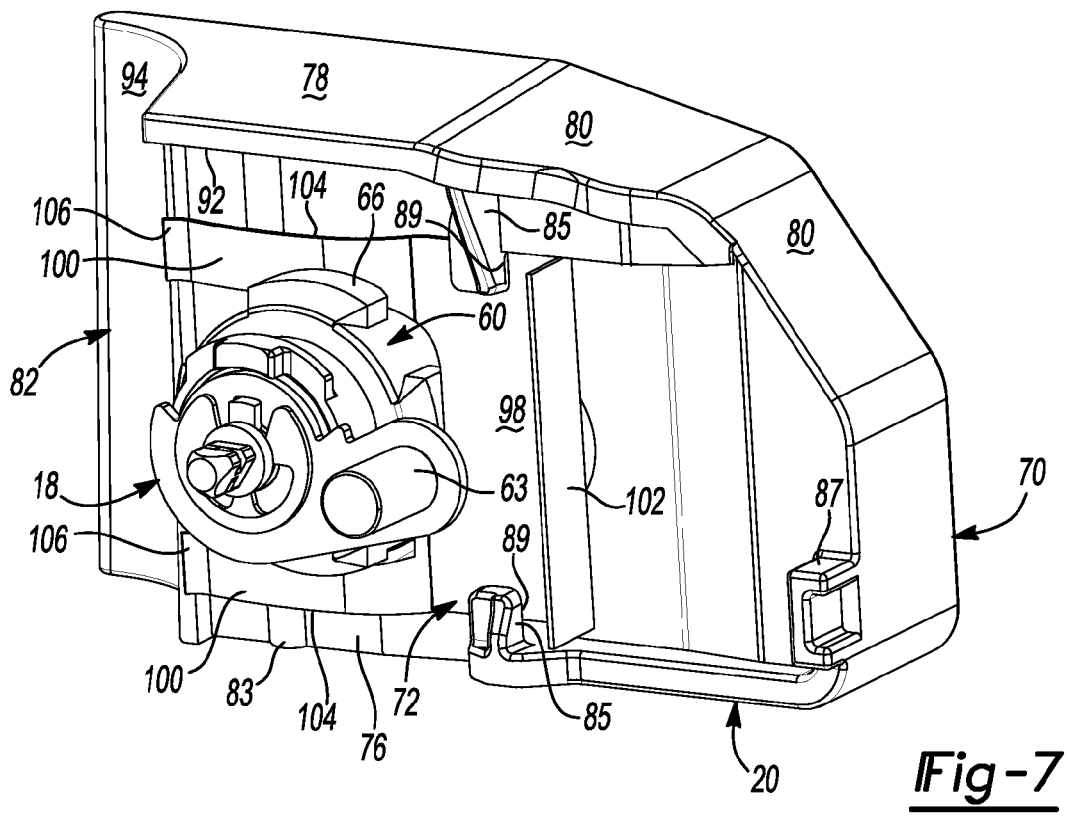
FIG. 7 is a perspective view of the retainer engaging the lock cylinder with the retainer clip in an engaged position.
Figure 8:
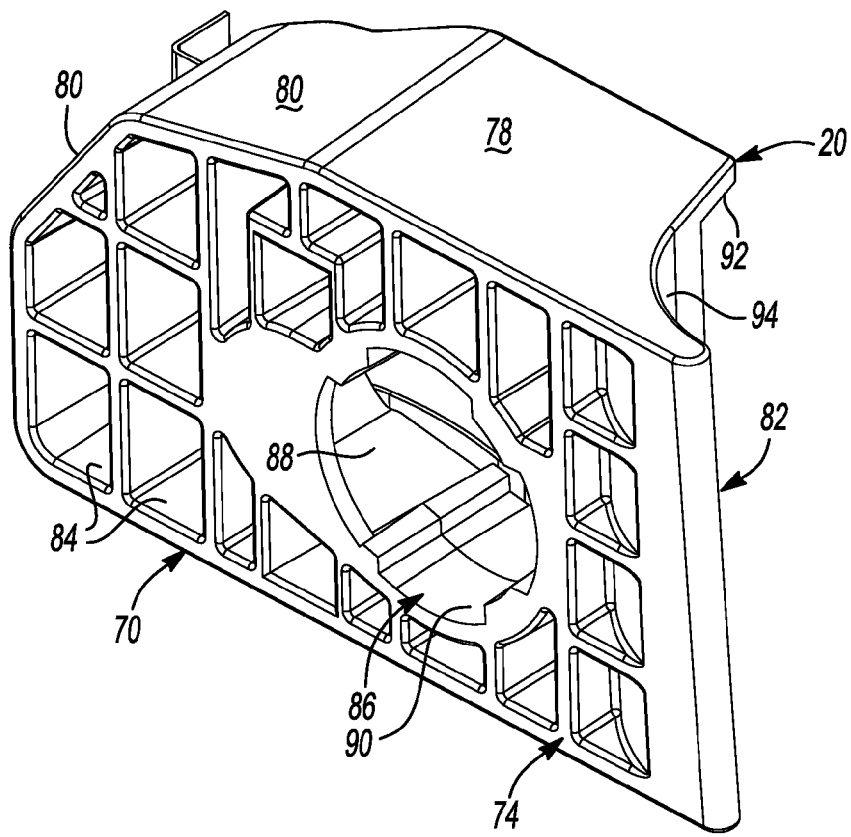
FIG. 8 is another perspective view of the retainer according to the principles of the present disclosure.
Figure 9:
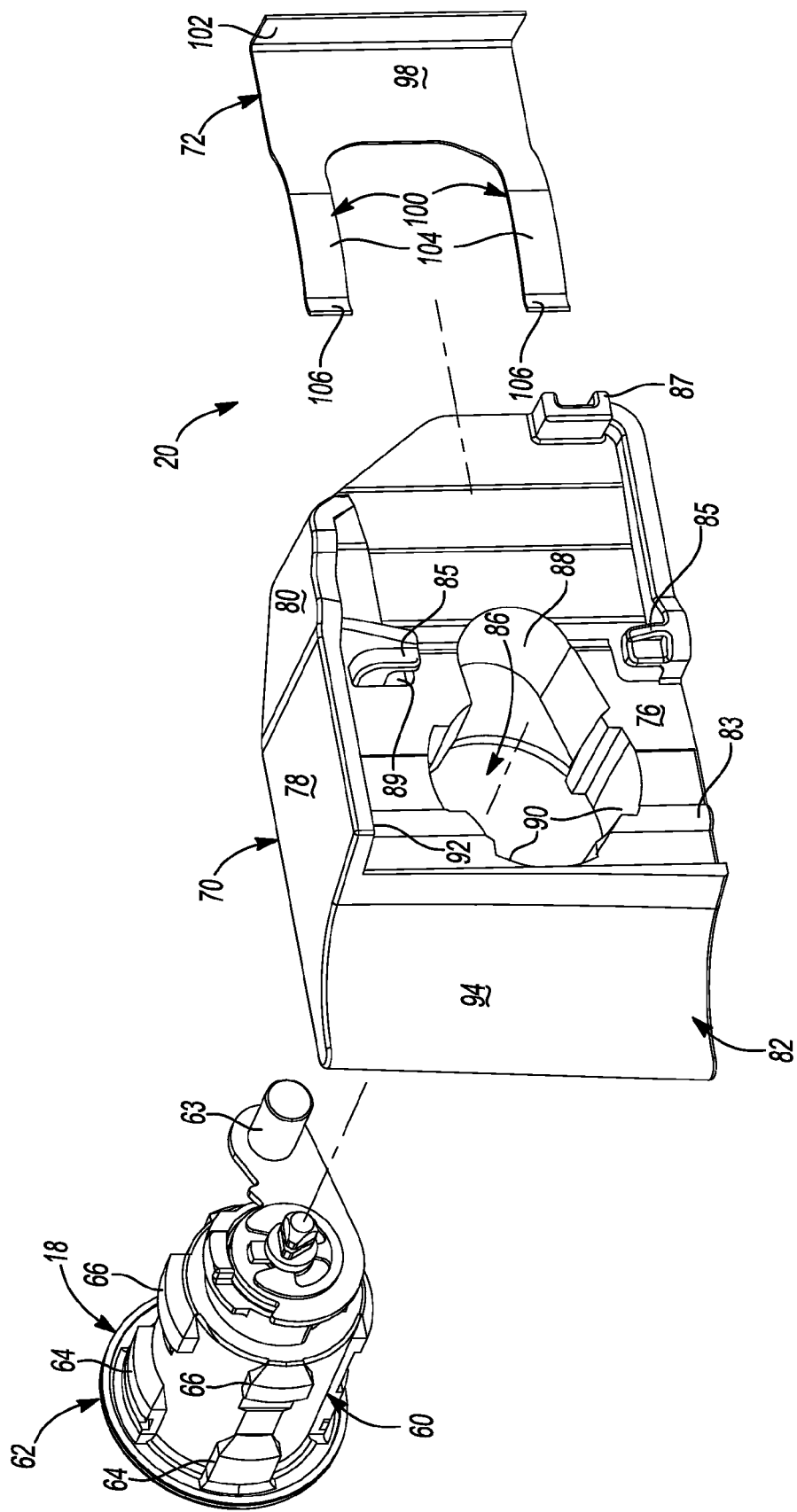
FIG. 9 is a partially exploded perspective view of the lock cylinder, retainer and retainer clip according to the principles of the present disclosure.

Referring to FIGS. 4-9, the lock cylinder 18 may include a generally cylindrical body portion 60, a head portion 62, and a crank member 63 extending outward from a distal end of the body portion 60. The body portion 60 may extend through one of the openings in the outer panel 12 and engage the retainer assembly 20. The body portion 60 may include a plurality of first lugs 64 and a plurality of second lugs 66 extending radially outward (FIG. 9). The first lugs 64 may be disposed between the second lugs 66 and the head portion 62. Each of the first lugs 64 may be angularly spaced apart from each other. Each of the second lugs 66 may be angularly space apart from each other and axially spaced apart from the first lugs 64. Each of the second lugs 66 may be substantially angularly aligned with a corresponding one of the first lugs 64. The head portion 62 may engage the outer panel 12 and may include a diameter that is larger than the aperture in the outer panel 12 through which the body portion 60 is received. The head portion 62 may include a key slot 68 (FIG. 2) through which a user may insert a key to lock and unlock the vehicle door 10.

The retainer assembly 20 may include a retainer block 70 and a retainer clip 72. The retainer block 70 may be a single unitary block of polymeric material and may include an outward-facing surface 74 (FIG. 8), an inward-facing surface 76, a reinforcement surface 78, one or more guide surfaces 80 and an engagement portion 82. The outward-facing surface 74 may face and/or abut the inward-facing surface 22 of the outer panel 12 and may include a plurality of cavities 84 formed therein (FIG. 8). The inward-facing surface 76 may be substantially parallel to the outward-facing surface 74 and may include a ridge 83 extending laterally across the inward-facing surface 76. A plurality of retaining members 85 and a stop member 87 may extend from the inward-facing surface 76. Slots 89 (shown best in FIG. 9) may be formed between the inward-facing surface 76 and the retaining members 85 that slidably engage the retainer clip 72.

The retainer block 70 may include an aperture 86 extending through the outward-facing and inward-facing surfaces 74, 76 and engaging the body portion 60 of the lock cylinder 18. The aperture 86 may include a recess 88 and a plurality of angularly spaced-apart notches 90 formed therein. The recess 88 may extend radially outward and may provide clearance for the crank member 63 so that the crank member 63 and body portion 60 can be inserted through the aperture 86. The notches 90 may be sized and arranged to receive the first and second lugs 64, 66 of the lock cylinder 18. Engagement between the notches 90 and the first lugs 64 may prevent rotation of the lock cylinder 18 relative to the retainer block 70 when the lock cylinder 18 is installed therein.

Figure 2:
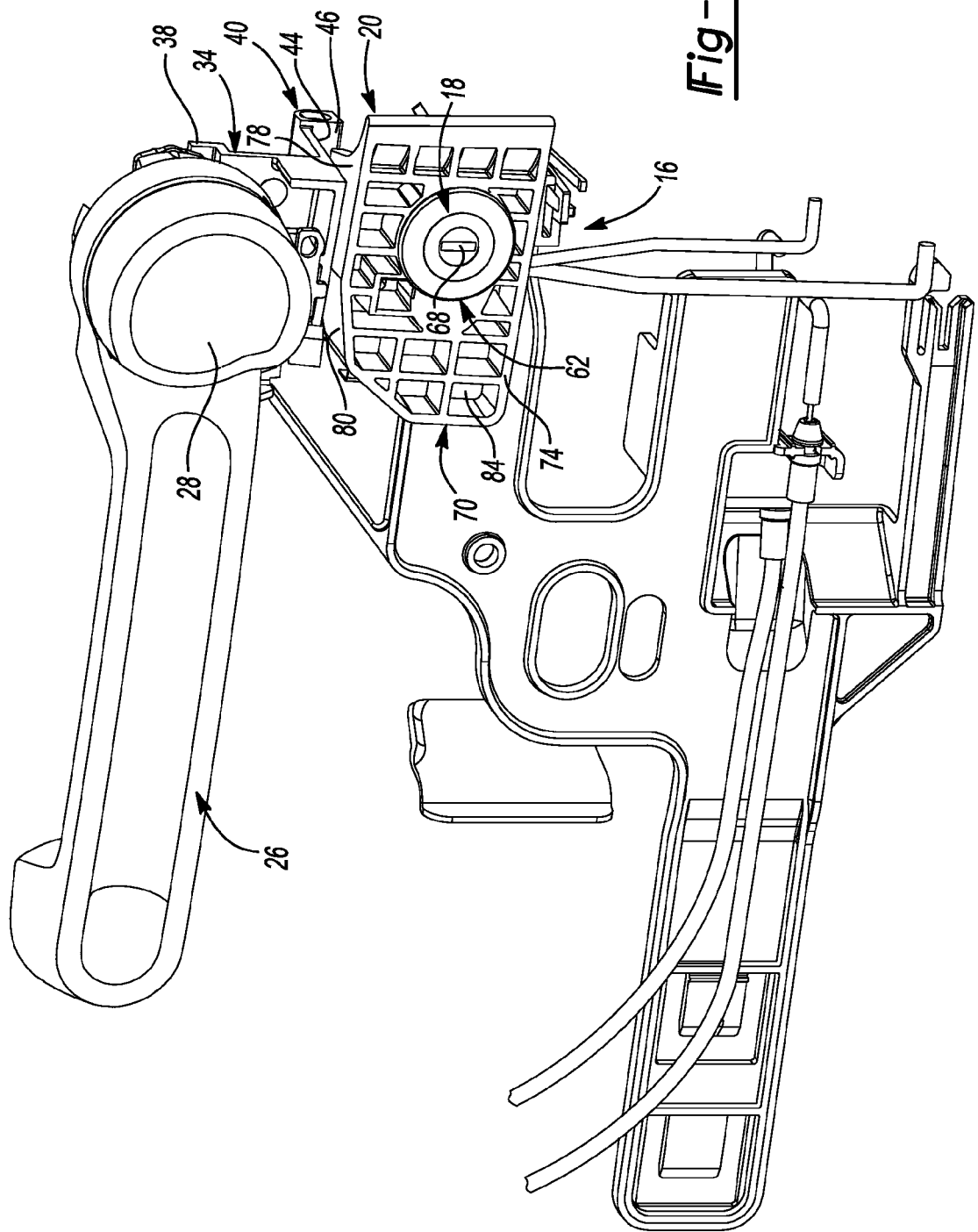
FIG. 2 is a partial perspective view of a door latch assembly, a lock cylinder and a retainer according to the principles of the present disclosure.

The reinforcement surface 78 may be substantially perpendicular to the outward-facing and inward-facing surfaces 74, 76 and may be disposed adjacent the engagement portion 82. The reinforcement surface 78 may extend from the outward-facing surface 74 and beyond the inward-facing surface 76 to form a lip 92 extending along a portion of a perimeter of the inward-facing surface 76. The reinforcement surface 78 may abut the landing surface 44 of the frame 34 (FIGS. 2 and 3). A distal end of the lip 92 may abut the stop surface 46 of the frame 34.

The guide surfaces 80 may extend between the outward-facing and inward-facing surfaces 74, 76 and may be disposed at a non-perpendicular angle relative to the reinforcement surface 78. The angle of the guide surfaces 80 may aid in positioning of the retainer block 70 and the frame 34 relative to each other during the assembly of the vehicle door 10. That is, the guide surfaces 80 may guide a worker in installing the frame 34 such that the landing surface 44 and the stop surface 46 engage the reinforcement surface 78 and lip 92 in the manner described above to ensure proper alignment of the door latch assembly 16 relative to the lock cylinder 18 and alignment of the door latch assembly 16 relative to the actuation mechanism 28.

The engagement portion 82, of the retainer assembly 20, may be disposed adjacent the reinforcement surface 78 and may include a curved surface 94 extending between the outward-facing and inward-facing surfaces 74, 76. As shown in FIG. 4, when the retainer block 70 is installed in the vehicle door 10, the curved surface 94 may be aligned with and/or engaged with a curved surface 96 of the inner panel 14 proximate the perimeter 32 of the vehicle door 10. In some embodiments, a gap may exist between the curved surface 94 and the curved surface 96 of the inner panel 14.

Figure 6:
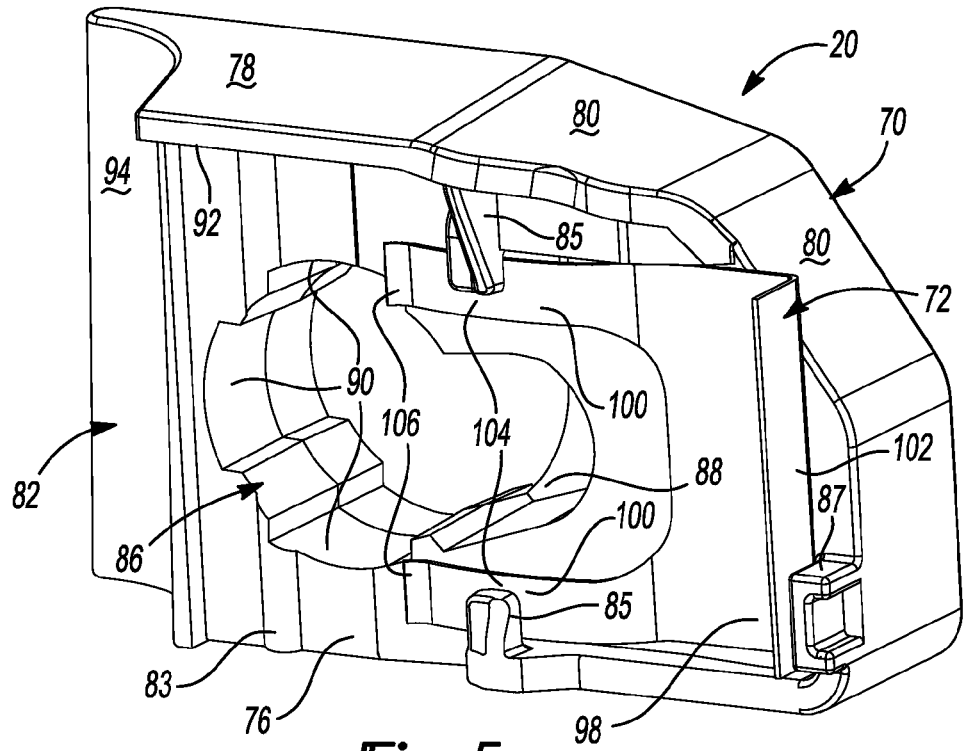
FIG. 6 is a perspective view of the retainer engaging the lock cylinder with the retainer clip in a disengaged position.
Figure 6:
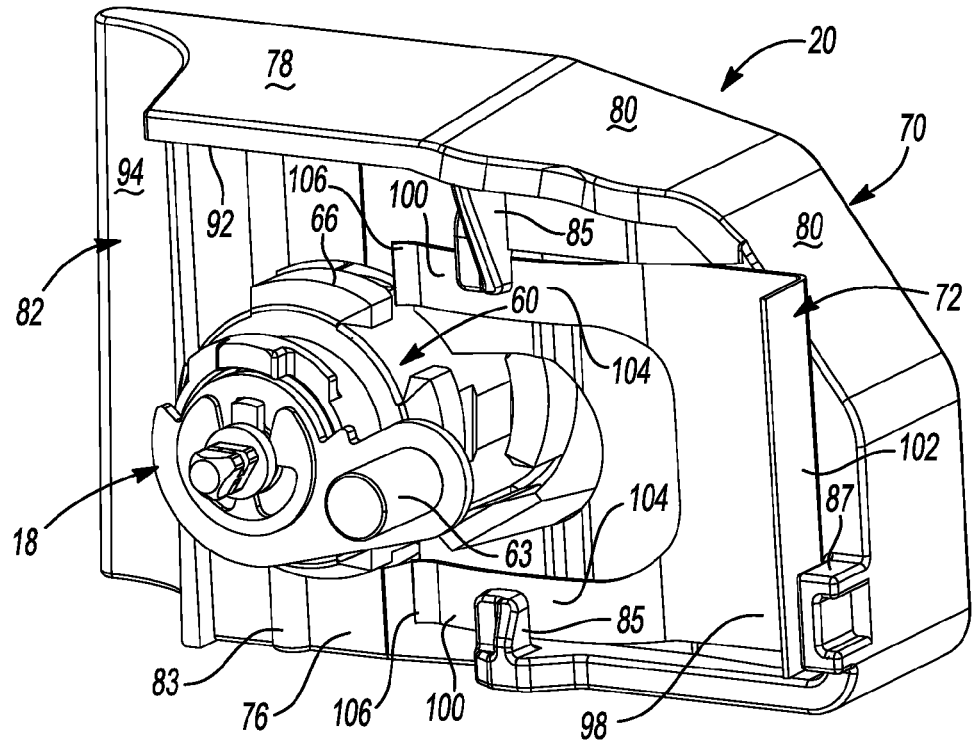

Referring to FIGS. 5, 6, and 9, the retainer clip 72, of the retainer assembly 20, may be formed from a metallic material, such as steel, for example, and may slidably engage the slots 89 between the retaining members 85 and the inward-facing surface 76 of the retainer block 70. The retainer clip 72 may include a body portion 98 and a pair of legs 100 that are spaced apart from each other and extend from the body portion 98. The legs 100 and the body portion 98 may cooperate to form a U-shape. The body portion 98 may include a lip 102 extending therefrom. Each of the legs 100 may include an undulation 104 that is spaced apart from the inward-facing surface 76. Distal ends 106 of the legs 100 may be angle or curved away from the inward-facing surface 76.

The retainer clip 72 may be slidably relative the inward-facing surface 76 between a disengaged position (FIG. 6) and an engaged position (FIG. 7). In the disengaged position, the body portion 98 may be spaced apart from the lock cylinder 18 such that the lip 102 abuts the stop member 87. In the engaged position, the legs 100 may be disposed between the second lugs 66 of the lock cylinder 18 and the inward-facing surface 76. When the retainer clip 72 is moved into the engaged position, the undulation 104 in the legs 100 may be compressed in order to fit between the second lugs 66 and the inward-facing surface 76. In this manner, the legs 100 apply a biasing force against the lock cylinder 18 and the retainer block 70 that retain the retainer clip 72 in the engaged position. When the retainer clip 72 is in the engaged position, the lock cylinder 18 is restricted or prevented from being removed from the retainer block 70, and therefore, the lock cylinder 18 is restricted or prevented from being removed from the vehicle door 10.

With continued reference to FIGS. 1-9, functions and operation of the retainer assembly 20 will be described. The retainer assembly 20 may restrict or prevent deflection or movement of the linkage 36 of the door latch assembly 16 during a side impact event and may cooperate with the outer and inner panels 12, 14 to restrict or prevent unauthorized removal, deflection and/or manipulation of the lock cylinder 18.

As described above, the reinforcement surface 78 abuts and reinforces the landing surface 44 of the frame 34 such that in the event that the door handle 26 and/or actuation mechanism 28 are forced inward into the cavity 30 between the outer and inner panels 12, 14 during a side impact event, for example, the reinforcement surface 78 may restrict or prevent downward movement or deflection of the frame 34 and the linkage 36. In this manner, the vehicle door 10 will not be unintentionally opened during a side impact event due to the door handle 26 and/or actuation mechanism 28 being forced inward in response to the impact.

The retainer assembly 20 may cooperate with the outer and inner panels 12, 14 to prevent or restrict rotational and/or lateral movement of the lock cylinder 18 by an unauthorized person from the outside of the vehicle. As described above, the lock cylinder 18 is inserted through an aperture in the outer panel 12 such that the body portion 60 extends into the cavity 30 and the head portion 62 engages the outward-facing surface 24 of the outer panel 12. The body portion 60 is fixedly secured to the retainer assembly 20, which abuts the inward-facing surface 22 of the outer panel 12. The curved surface 94 of the engagement portion 82 of the retainer block 70 will engage the curved surface 96 of the inner panel 14 and restrict or prevent rotational or side-to-side movement of the retainer block 70 in response to a force being applied to the lock cylinder 18 from outside of the vehicle. An application of a rotational or side-to-side force to the lock cylinder 18 from outside of the vehicle (e.g., a force applied by a person attempting to gain forcible, unauthorized entry into the vehicle with a screwdriver, for example, or any other tool) may cause deflection of the outer panel 12, which may close any gap between the curved surfaces 94, 96 of the retainer block 70 and inner panel 14, respectively, thereby strengthening the engagement between the retainer block 70 and the outer and inner panels 12, 14.

Engagement between the retainer clip 72 and the lock cylinder 18 may prevent or restrict the lock cylinder 18 from being removed outward through the aperture in the outer panel 12. As described above, engagement between the notches 90 in the aperture 86 and the first lugs 64 prevents relative rotation between the lock cylinder 18 and the retainer block 70.

What is claimed is:

1. An apparatus comprising:
   a door-latch-mechanism frame supporting a linkage and including a landing surface;
   a retainer including an aperture and a first surface engaging said landing surface and restricting deflection of said linkage; and
   a door-lock cylinder received in said aperture and supported by said retainer,
   wherein said retainer includes a tapered portion adapted to be wedged between and engage outer and inner door panels in response to movement of the retainer relative to the outer door panel to restrict motion of said door-lock cylinder relative to said door-latch mechanism frame.

2. The apparatus of claim 1, wherein said retainer is disposed between said outer and inner door panels and said tapered portion substantially perpendicular to said first surface.

3. The apparatus of claim 2, wherein a substantially planar surface and a curved surface cooperate to form said tapered portion.

4. The apparatus of claim 3, wherein said planar surface engages said outer door, substantially panel.

5. The apparatus of claim 1, further comprising a retainer clip engaging said retainer and said lock cylinder and including a body portion and a plurality of legs extending therefrom.

6. The apparatus of claim 5, wherein said retainer includes an inward-facing surface and an outward-facing surface that are substantially perpendicular to said first surface, said aperture extending through said inward-facing and outward-facing surfaces.

7. The apparatus of claim 6, wherein said retainer clip slidably engages said inward-facing surface and is movable between an engaged position and an unengaged position.

8. The apparatus of claim 6, wherein said first surface extends from said outward-facing surface beyond said inward-facing surface.

9. The apparatus of claim 1, further comprising an exterior door handle extending outward from said outer door panel, said landing surface being disposed between said exterior door handle and said retainer.

10. The apparatus of claim 1, wherein said retainer includes a guide surface that is adjacent said first surface and disposed at a non-perpendicular angle relative thereto.

11. A vehicle door comprising:
    an outer door panel;
    an inner door panel connected to said outer door panel;
    a latch mechanism frame disposed between said inner and outer door panels;
    a lock cylinder extending through said outer door panel; and
    a retainer engaging said latch mechanism frame and including an aperture receiving said lock cylinder and a tapered portion disposed in a space between said outer and inner door panels, said tapered portion engaging said outer and inner door panels to restrict motion of said lock cylinder relative to said latch mechanism frame.

12. The vehicle door of claim 11, wherein a substantially planar surface and a curved surface cooperate to form said tapered portion.

13. The vehicle door of claim 12, wherein said substantially planar surface engages said outer door panel.

14. The vehicle door of claim 11, further comprising a retainer clip engaging said retainer and said lock cylinder and including a body portion and a plurality of legs extending therefrom.

15. The vehicle door of claim 14, wherein said retainer includes an inward-facing surface and an outward-facing surface, said retainer clip slidably engaging said inward-facing surface for movement between an engaged position and an unengaged position.

16. The vehicle door of claim 11, wherein said latch mechanism frame supports a linkage and includes a landing surface, said retainer including a support surface engaging said landing surface and restricting deflection of said linkage.

17. The vehicle door of claim 16, further comprising an exterior door handle extending outward from said outer door panel, said landing surface being disposed between said exterior door handle and said retainer.

18. The vehicle door of claim 17, wherein said latch mechanism frame includes a member connected to said landing surface and engaging said exterior door handle.

19. The vehicle door of claim 16, wherein said retainer includes a guide surface that is adjacent said landing surface and disposed at a non-perpendicular angle relative thereto.

20. The vehicle door of claim 16, wherein said support surface extends from an outward-facing surface beyond inward-facing surface.

\* \* \* \* \*